June 30, 1970   Q. T. CLEMMONS   3,517,784
PNEUMATIC-HYDRAULIC TREAD BRAKE UNIT FOR RAILWAY CAR TRUCKS
Filed May 10, 1968   2 Sheets-Sheet 1

INVENTOR.
QUENTIN T. CLEMMONS
BY
*A. A. Steinmiller*
ATTORNEY

June 30, 1970  Q. T. CLEMMONS  3,517,784
PNEUMATIC-HYDRAULIC TREAD BRAKE UNIT FOR RAILWAY CAR TRUCKS
Filed May 10, 1968  2 Sheets-Sheet 2

INVENTOR.
QUENTIN T. CLEMMONS
BY
*A. A. Steinmiller*
ATTORNEY 3,517,784
PNEUMATIC-HYDRAULIC TREAD BRAKE UNIT
FOR RAILWAY CAR TRUCKS
Quentin T. Clemmons, North Versailles, Pa., assignor to
Westinghouse Air Brake Company, Wilmerding, Pa.,
a corporation of Pennnsylvania
Filed May 10, 1968, Ser. No. 728,133
Int. Cl. F16d 65/74
U.S. Cl. 188—196                                    10 Claims

ABSTRACT OF THE DISCLOSURE

A pneumatically controlled hydraulically actuated tread brake unit to be utilized on each wheel of a railroad car; the unit being of the "snow brake" type in which a brake shoe of the unit remains in light pressure contact with the tread of the wheel at all times to produce heat on the tread of the wheel and the brake shoe which heat keeps ice from forming on the tread of the wheel. A hydraulic type slack adjuster automatically compensates for wear of the brake shoe. Out-of-roundness of the car wheel while the brakes are applied is automatically compensated for through absorption of hydraulic pressure variations by the pneumatic portion of the tread brake unit. A novel valve means within the hydraulic portion of the tread brake unit facilitates slack adjustment and easy manual separation of the brake shoe from the tread of the wheel for easy maintenance operation.

Background of the invention

Automatic slack adjusting tread brake units for individual car wheels of railway and rapid transit cars of the passenger type utilized in subway services are coming increasingly into service. Their compactness and reliability have been known to be superior to the larger, heavier brake units hereuntofore utilized.

In U.S. Pat. 3,447,647, issued June 3, 1967 to Joseph G. Stipanovic, and assigned to the assignee of this application, a pneumatically controlled hydraulically actuated tread brake unit of the "snow brake" type for each wheel of a railway car is disclosed. This tread brake unit utilizes an accumulator and a port system between the reservoir and the hydraulic cylinder of the unit, which arrangement, although satisfactory, made prying the brake shoe from the tread of the wheel difficult incidental to replacement or repair of the brake shoe.

It is, therefore, the object of the present invention to provide a relatively small, lightweight tread brake unit of the "snow brake" type which provides necessary braking force amplification, and which includes a new and improved valve unit in the hydraulic cylinder which allows the manual separation of the tread brake shoe from the tread of the wheel to be easily performed by an unskilled laborer in a railway yard. The valve unit further automatically compensates for wear of the brake shoe and/or wheel as well enabling reverse displacement of hydraulic fluid in the system to thereby obviate the need for the previously used accumulator and provides uniform braking notwithstanding out-of-roundness of the wheel.

Summary

According to the invention, a pneumatically controlled hydraulically actuated tread brake unit is provided comprising a casing on which a brake head and shoe are movably supported for actuation by a hydraulic pressure actuated piston operable in a bore in said casing. The hydraulic pressure system includes a reservoir and a pneumatic-pressure actuated plunger which is reciprocated in a second bore, communicating with the first bore within the casing, by supply and release of compressed air to a piston to which the plunger is connected. A port provides communication between the reservoir and the bore in which the plunger operates. A valve associated with the plunger in turn controls the supply of hydraulic fluid to the system from the reservoir. The valve is designed so that when the brake is released, the shoe can be separated manually from the tread of the car wheel by a lever, such as a crowbar, which forces hydraulic fluid reversely through the valve and the port and back into the reservoir, facilitating removal of the brake shoe and repair of any portion of the tread brake unit.

Description of the preferred embodiments

Figure 1:
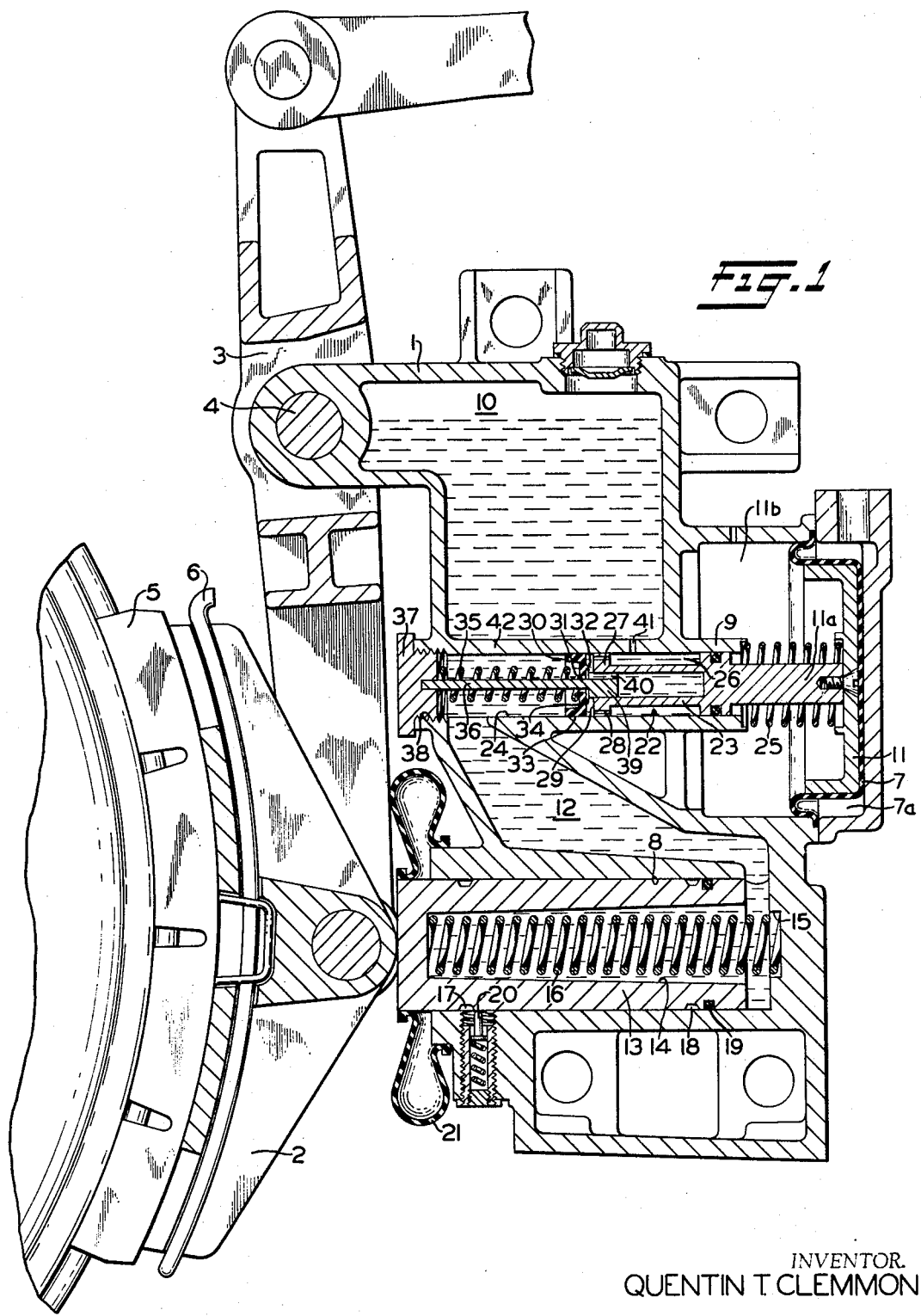
FIG. 1 is a side elevational view, partially in section, of the tread brake unit embodying the invention.

As shown in the drawings, a hydraulic-pneumatic brake unit, one of which is provided for each wheel of a car truck is suitably secured, as by bolts and nuts, to the frame of the car truck in appropriate relation to a car wheel.

As further shown in the drawings, the brake unit comprises a casing 1 and a brake head 2 pivotally suspended on the lower end of a combined brake lever and hanger 3 pivotally mounted intermediate its ends on pin 4 in a projecting boss of said casing. The brake head carries a brake shoe 5, secured to the brake head by a conventional key 6, for frictionally engaging the tread of the wheel as hereafter more fully described.

Within the casing 1 is a pneumatic-pressure actuated diaphragm 7 within chamber 7a and a hydraulic system including two hydraulic cylinders 8 and 9 and a hydraulic fluid reservoir 10.

The diaphragm is fitted to a follower 11 and the follower 11 is fixed to stem 11a within a chamber 11b on the side of the diaphragm follower and diaphragm opposite to chamber 7a.

Any out-of-roundness of the wheel, that would cause variations in braking on every revolution of the wheel when the brake is being applied, is automatically compensated for and eliminated by diaphragm 7 and the pneumatic fluid in chamber 7a, as more fully explained hereinafter.

Hydraulic cylinder 8 is located in the casing 1 and communicates with cylinder 9 by way of a communicating passage 12. Within the hydraulic cylinder 8 is a piston 13 having a longitudinal bottomed bore 14 opening at the inner end of the piston. Interposed with the bottomed bore 14 between the piston 13 and a seat 15 in casing 1 is a coil spring 16 which constantly exerts force on the piston in a direction tending to force the piston out of the hydraulic cylinder. The function of spring 16 is to hold the brake shoe 5 in light pressure contact with the tread of the wheel so that heat is generated on both friction surfaces to prevent accumulation of ice and snow on the tread of the wheel.

The piston 13 has three circumferential grooves 17, 18 and 19 around the periphery thereof. Groove 19 is close to the inner end of the piston and contains a conventional O-ring sealing means. The groove 18 is adjacent said O-ring groove 19 and the third groove 17 is at the other end of the piston, which is the end that extends to the outside of the hydraulic cylinder 8 and the outside of the casing. Close to the mouth of the hydraulic cylinder 8 is a spring loaded detent 20 which is adapted to engage the circumferential groove 17 in the piston to hold the piston at bottom dead center when the spring 16 is fully compressed. The detent is also to engage the other circumferential groove 18 to prevent the piston from being expelled from the hydraulic cylinder 8 by the force of the spring 16 within the piston when the brake head 2 is removed. On the piston's outer or closed end is an annular resilient dust cover or boot 21 which has one end fixed to the casing 1 and the other end fixed to the piston 13 to prevent dust and moisture from entering into the hydraulic cylinder 8 between the outer wall of the piston and the inner wall of the cylinder.

Within cylinder 9 is a plunger means 22 comprising a piston 23 which reciprocates within a bore 24. The piston is biased normally by a spring 25 in the right-hand direction, as viewed in the drawings, to a position in which the diaphragm 7 engages a wall of the chamber 7a.

The piston 23 has an annular peripheral groove 26 which forms a flange 27 at the end of the piston. Within this flange 27 are ports 28 each extending longitudinally to communicate the groove 26 with the end face or head 29 of the piston.

A seal means or packing cup 30 having a central bore 31 and on its right-hand side a rib 32 that is adapted to seat on face 29 so that fluid cannot flow from the annular groove 26 through the bore 31.

The packing cup 30 also has an outer sealing periphery or lip 33 which contacts and seals on the wall of bore 24. An inside face 34 of the cup 30 has a spring 35 seated thereon adapted to bias said cup to the right as viewed in FIGS. 1 and 2.

A stop 36 is threaded into a plug 37 which in turn is screwed into a threaded portion 38 of bore 24 in casing 1. Stop 36 has flange 39 at one end and a port 40 therein adapted to permit the communication of fluid around flange 39.

An orifice 41, located in the floor 42 of reservoir 10, is always open to communicate fluid from reservoir 10 to groove 26.

Operation

Assume that the brake shoe 5 is in its release position as shown in FIG. 1 with a light pressure brake application being applied by spring 16. If the trainman desires to initiate a brake application to stop or decelerate the train, he will actuate an appropriate mechanism within the cab that will allow compressed air to enter chamber 7a via a port and actuate diaphragm 7 which will cause stem 11a to be moved in the direction of the left hand. The piston 23 will pick up packing cup 30 and the packing cup rib 32 thereon will form a seal against end face 29 and the piston and packing cup will continue moving unitarily overcoming the force of the springs 35 and 25.

This movement will cause hydraulic fluid within passage 12 to be displaced applying pressure within cylinder 8 to piston 13 which abuts brake head 2 and causes the brake shoe 5 to be applied with greater force to the tread of the wheel for braking the train.

Assume that the train has been stopped in a railway yard and it is desired that the brakes be released. To effect a brake release, the engineman will actuate appropriate controls within the cab causing compressed air in chamber 7a to be released whereupon the springs 25 and 35 return the diaphragm 7 and packing cup 30 in the direction of the left hand until the packing cup 30 is stopped by flange 39. The piston 23 will continue to move an additional short distance due to the force of spring 25. This additional movement causes the packing cup rib 32 to be separated from the end face 29 of the piston 23 thereby opening a fluid connection between passage 12 and the reservoir 10 by way of bore 24, center bore 31 of packing cup 30, ports 28 of piston 23 and orifice 41 in the floor 42 of reservoir 10.

If wear of the brake shoe 5 should occur while a brake application is in effect, it will be understood that, when a subsequent brake release is effected, the spring 16 will maintain the brake shoe 5 against the tread surface of the car wheel so that the piston 13 occupies a position in the cylinder 8 that is to the left of the position in which this piston is shown in FIG. 1. Accordingly, it will be apparent that the wear of the brake shoe 5 has caused an increase of the volume of chamber 12. Consequently, when the end face 29 of the piston 23 is moved away from the rib 32 on the packing cup 30, hydraulic fluid in the reservoir 10 will flow to the chamber 12 via orifice 41, groove 26, ports 28, bore 31 in packing cup 30 and bore 24. It will be understood that the quantity of hydraulic fluid that is supplied to the chamber 12 from the reservoir 10 corresponds to the increase in the volume of the chamber 12 as the result of the wear of the brake shoe 5. Of course it will be understood that if there is no wear of brake shoe 5, there is no increase in the volume of chamber 12.

Any out-of-roundness of the wheel affecting the adjacent brake shoe is automatically compensated for during a brake application and during a brake release, when the "snow brake" remains in operation. This is accomplished by the pneumatic portion of the tread brake during application and the open communication to the reservoir during release.

During a brake application, out-of-roundness of the wheel is compensated for when the eccentric type motion of the wheel causes the brake shoe 5, brake head 2 and piston 13 to move against the force of spring 16 which in turn moves them in the opposite direction accomplishing a reciprocation and holding the brake shoe 5 against the tread of the wheel. When this occurs hydraulic fluid in passage 12 being incompressible, exerts force against packing cup 30 and piston 23. Piston 23 and follower 11 are being held by a compressible fluid within chamber 7a, therefore, the follower 11 and diaphragm 7 in turn compress the fluid in chamber 7a and compensate for the apogee of the wheel, insuring that the brake shoe 5 remains against the wheel at all times eliminating any damaging slap of the shoe against the tread of the wheel and relieves possible pulsating brake action.

During a brake release when the "snow brake" is still in operation any out-of-roundness of the wheel is compensated for in the same manner, however, the hydraulic fluid in passage 12 does not move against packing cup 30 but through bore 31 in the center of packing cup 30 and into the reservoir 10 by way of ports 28 and orifice 41. Since the brake is in release position this communication is open as described above.

If the yardman desires to use a crowbar and pry the brake shoe 5 from the tread of the wheel this could be done very easily to facilitate repair or replacement of the brake shoe or head. The piston 13 will be moved by the brake head 2 until detent 20 clicks into groove 17 and holds piston 13 in this fixed position. During this short motion fluid can flow back into reservoir 10 past the packing cup 30, as previously described, via groove 26 and port 41. When the repairs are complete a normal brake application will force spring loaded detent 20 out of groove 17 and a release of this brake application will again leave the system in a light pressure type application.

Figure 3:
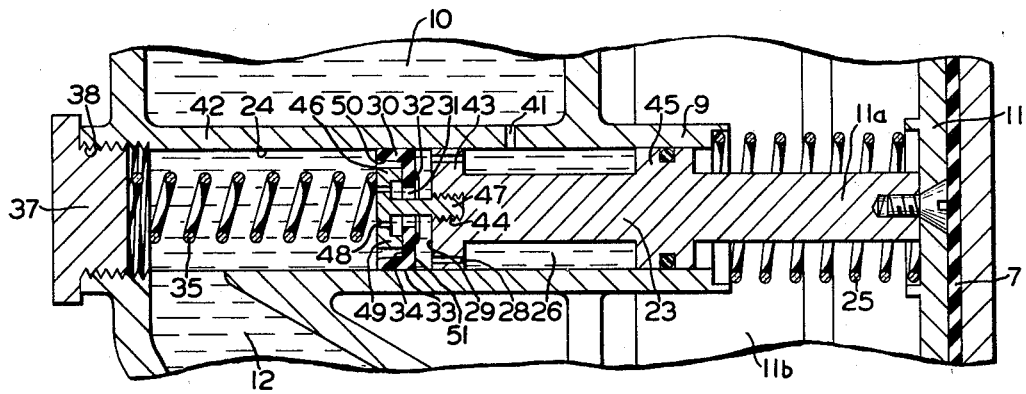
FIG. 3 is an enlarged fragmentary view of a modification of the valve shown in FIGS. 1 and 2.

A modified form of the invention is shown in FIG. 3 which is similar in general to that of the previously described embodiment. Accordingly, corresponding elements in the two embodiments are identified by the same reference numerals without additional description, and only so much of the embodiment of FIG. 3 as differs from the previous embodiment will be described.

Figure 2:
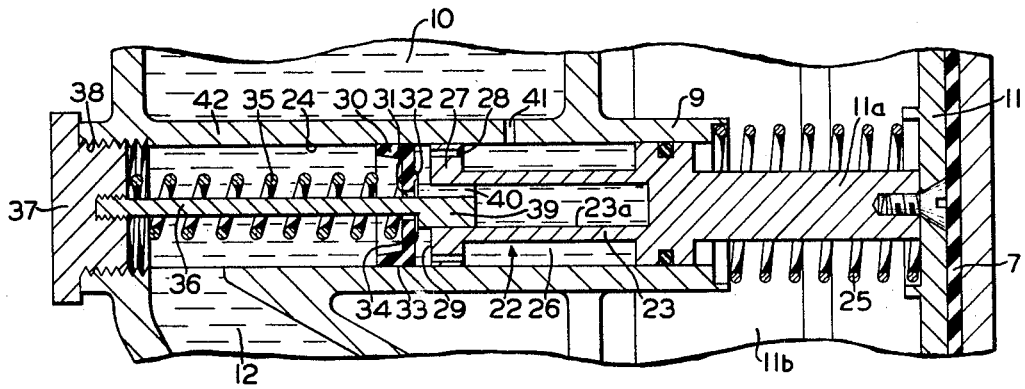
FIG. 2 is an enlarged fragmentary view of the valve shown in FIG. 1.

Essentially, the embodiments of FIG. 3 differs from that of FIG. 2 in providing a different arrangement for the stop means associated with the packing cup 30.

In FIG. 3, the piston 23 has an annular peripheral groove 26 and a flange 43 at one end of the groove 26. Flange 43 has radially spaced ports 28 therein adapted to communicate fluid within the bore 24 through the groove 26. The bore 24 has the orifice 41 in its outer wall which communicates fluid from bore 24 to the reservoir 10. At the port end of piston 23 is a central threaded bottomed bore 44 and at the other end of groove 26 is another flange 45 with a circumferential groove and a conventional O-ring seal therein adapted to contact the inside wall of bore 24 and maintain sealing relation therewith.

A stop means 46 has a separate or integral (as shown), threaded center post 47 adapted to be screw threaded into threaded bottomed bore 44 of piston 23. The stop means 46 is provided with a plurality of ports 48 which are arcuately spaced and parallel to the center post 47. A tubular flange 49 extends in the direction of the right hand from the periphery of the stop means 46 and is parallel to and concentric with center post 47.

Reciprocably located between the flange 43 and stop 46 is a cup-shaped seal means or packing cup 30. The seal 30 has a cylindrical outer wall 33, in tight contact with the inside of bore 24 and an inner wall 50 which is tapered radially inwardly toward the bottom 34 of the cup 30. An aperture 31 is centrally located in the bottom 34 of the cup and an annular seal or rib 32 surrounds the aperture 31 on the right hand side 51 of the cup-shaped seal means 30.

A spring 35 is inserted in the bore 24 by way of a screw-threaded bore 38 and retained therein by the plug 37. The spring 35 abuts the plug and the stop means 46 thereby exerting force on piston 23 and diaphragm 7, this spring 35 being aided by spring 25.

The operation of applicant's modification through the brake aplication and slack adjustment is similar with the operation of the invention as previously described in relation to FIGS. 1 and 2. However, assuming that the train has been stopped in a railway yard and it is desired that the brake be returned to a release position, it will now be seen that there is a slight difference in operation from the first embodiment of the invention. To accomplish this desired release, the engineman will actuate an appropriate mechanism within the cab causing compressed air in chamber 7a (FIG. 1) to be released whereupon the force of springs 25 and 35 will return the diaphragm 7 to a stop release position against the wall of chamber 7a. The packing cup 30 will not move until it is picked up by the tubular flange 49 of the stop means 46 because the packing cup seat or rib 32 is immediately separated from the end face of the piston 23, upon initial piston movement, which opens a fluid connection between passage 12 and reservoir 10 by way of bore 24, center bore 31 in the packing cup 30, ports 28 in flange 43 of piston 23 and orifice 41 in the floor 42 of the reservoir 10. However, if brake shoe wear occurred during the brake application spring 16 will hold piston 13 against the heel of brake head 2 in typical "snow brake" type fashion and fluid will now flow from the reservoir 10 to the chamber 12 in the manner hereinbefore described in detail for the first embodiment of the invention.

If the yardman desires to use a crowbar to pry the brake shoe 5 from the tread of the wheel, this could be done very easily to facilitate the repair or replacement of the brake shoe or head. Since the seat or rib 32, although separated earlier from the end face 29 of the piston 23, is still in the same position to communicate flow from passage 12 to reservoir 10, the operation of repair or replacement of the brake shoe would be identiical to the above-described operation with respect to the embodiment of the invention shown in FIGS. 1 and 2.

When the repairs are complete, a normal brake application will cause spring loaded detent 20 to move out of groove 17 as previously described leaving this system in a light service "snow brake" type application.

Having now described the invention, what I claim as new and desire to secure by Letters Patent is:

1. Brake apparatus comprising:
   (a) a casing,
   (b) brake means movably supported for frictionally applying a braking force to an element to be braked,
   (c) said casing having formed therein,
      (i) a fluid source holding a supply of fluid,
      (ii) a first cylinder means to which fluid from said fluid source is communicated,
      (iii) a second cylinder means to which fluid is communicated from said first cylinder means,
   (d) a piston operable in said second cylinder means and operatively connected to said brake means,
   (e) spring means constantly exerting a light force on said piston to effect light pressure application to said brake means, said piston being subject to the fluid pressure established in said second cylinder means to effect a braking force on said element to be braked to a desired degree in addition to said normal light pressure application,
   (f) pressure-actuated plunger means operable in said first cylinder means to apply pressure to the fluid in said first cylinder means wherein said plunger means comprises a plunger and a sealing means, said sealing means being shiftable relative to the plunger to open and close communication between said first cylinder means and said reservoir responsive to movement of the plunger in opposite directions.

2. The apparatus of claim 1, wherein said pressure-actuated plunger means includes said sealing means, an adjacent piston means and a concentric stop means all of which allows fluid to be returned from said first cylinder means through said sealing means to said fluid source to facilitate manual movement of said brake means from said element to be braked while said brake apparatus is in a release position.

3. The apparatus of claim 2, wherein said stop means is attached to said casing.

4. The apparatus of claim 2, wherein said stop means is attached to said piston and said sealing means is located therebetween.

5. The apparatus of claim 3, wherein said stop means further comprises a long rod having a flange on one end and a port in the said flange, said rod being threaded at the other end whereby it may be secured to said casing.

6. The apparatus of claim 4, wherein said stop means further comprises a flange portion and an integral threaded center post means having one end attached to said flange portion and another end adapted to fit within a bore in the head of said piston, and port means radially spaced from said center post and extending through said flange portion of said stop means, said flange portion having a tubular periphery surrounding it parallel to and concentric with said post means.

7. The apparatus of claim 2, further characterized in that said piston includes a circumferentially disposed annular cavity thereon and bore means in the head of said piston axially radially spaced communicating with said annular cavity and adapted to communicate fluid from said fluid source to the said sealing means.

8. The apparatus of claim 2, wherien said first cylinder means comprises a return spring means coaxial with said cylinder and adapted to hold said piston and said stop means in a release position.

9. The apparatus of claim 1, wherein said plunger means is adapted to be held in a release position by a spring means.

10. The apparatus of claim 1, wherein said plunger means further comprises pneumatically actuated piston means adapted to compress the adjacent pneumatic fluid when the means to be braked is being braked and is of an eccentric, out-of-round character.

References Cited

UNITED STATES PATENTS 2,201,571  5/1940  Aikman.
2,234,689  3/1941  Chard.

DUANE A. REGER, Primary Examiner

U.S. Cl. X.R.

60—54.5; 188—198